United States Patent [19]

Inada et al.

[11] Patent Number: 4,841,780
[45] Date of Patent: Jun. 27, 1989

[54] CROSS CORRELATION FLOWMETER

[75] Inventors: Yutaka Inada; Koyata Sugimoto, both of Tokyo, Japan

[73] Assignee: Tokico Ltd., Japan

[21] Appl. No.: 50,203

[22] Filed: May 14, 1987

[30] Foreign Application Priority Data

May 16, 1986 [JP] Japan .................................. 61-73511

[51] Int. Cl.$^4$ .............................................. G01F 1/712
[52] U.S. Cl. .................................................. 73/861.06
[58] Field of Search ........................ 73/861.06, 861.04; 364/510, 565

[56] References Cited

U.S. PATENT DOCUMENTS

| 4,019,038 | 4/1977 | Critten et al. | 73/861.06 |
| 4,248,085 | 2/1981 | Coulthard | 73/861.06 |
| 4,598,593 | 7/1986 | Sheen et al. | 73/861.06 |
| 4,604,904 | 8/1986 | Massen | 73/861.06 |

FOREIGN PATENT DOCUMENTS 59-173715  1/1984  Japan .

OTHER PUBLICATIONS

R. S. Madlock Brown Boveri, 311-318.

Primary Examiner—Stewart J. Levy
Assistant Examiner—Robert P. Bell
Attorney, Agent, or Firm—Andrus, Sceales, Starke & Sawall

[57] ABSTRACT

A cross correlation flowmeter for measuring a flow rate of a fluid comprises a conduit through which the fluid to be measured the flow rate is flowing, first and second upstream sensors disposed on the conduit along a longitudinal direction thereof for sensing passage of the disturbance, a plurality of downstream sensors disposed on the conduit along the longitudinal direction of the conduit at a downstream side relative to the first and second upstream sensors for sensing the passage of the disturbance, first flow velocity detecting circuit for detecting a first flow velocity by calculating a maximum of a cross correlation of output signals from the first and second sensors, selecting circuit for selecting one of the downstream sensors providing a maximum accuracy of the flow rate responsive to the first flow velocity, and flow rate calcualting circuit for calculating the flow rate by finding out a maximum of the cross correlation of output signals from the first upstream sensor and the selected one of the downstream sensor.

11 Claims, 8 Drawing Sheets

CROSS CORRELATION FLOWMETER

BACKGROUND OF THE INVENTION

The present invention generally relates to flowmeters and more particularly to a cross correlation flowmeter for measuring a flow rate of a fluid flowing through a conduit by detecting a movement of a disturbance of fluid transported along the conduit by means of at least two sensors disposed on the conduit along a longitudinal direction thereof, in which the flow rate is obtained on the basis of a cross correlation of two output signals produced by the two sensors.

A fluid flowing through a conduit usually includes a disturbance such as a disturbance of flow velocity or temperature of the fluid naturally formed in the fluid to some extent. The disturbance is transported through the conduit with the fluid. The disturbance continuously changes as it is transported with the fluid. Conventionally, there is a cross correlation flowmeter for obtaining a flow rate of a fluid flowing through a conduit by detecting a movement of such a disturbance. For example, Critten et al. discloses in U.S. Pat. No. 4,019,038 a cross correlation flowmeter using two sensors respectively disposed at an upstream position and downstream position on a conduit. Further, R. S. Medlock describes a general technique of cross correlation flowmeter using two sensors in an article entitled "Cross Correlation Flow Measurement", Brown Boveri Review 6/7, 311–318, 1984. The prior art cross correlation flowmeter generally comprises a conduit through which a fluid is flowing, a first sensor disposed on the conduit at an upstream position for sensing a disturbance of the fluid transported along the conduit with the fluid, a second sensor disposed on the conduit at a downstream position relative to the first sensor with a predetermined distance therebetween for sensing the same disturbance sensed by the first sensor after a time determined by the distance between the two sensors and the flow velocity of the fluid, and means for calculating cross correlation of output signals from the first and second sensors and for obtaining a time difference between the output signals which maximizes the cross correlation of the two output signals. As the disturbance moves with the fluid, the time difference indicates a transit time required for a disturbance to move from the first sensor to the second sensor in the conduit. By dividing the distance between the two sensors by the transit time, the flow velocity is obtained and a flow rate is calculated on the basis of the flow velocity thus obtained.

In cross correlation flowmeters, measurement of the transit time generally involves an uncertainty due to a finite sharpness of a cross correlation peak indicating the maximum of the cross correlation. Accordingly, in order to achieve an accurate measurement, it is necessary to choose the distance between the upstream sensor and the downstream sensor as long as possible. However, the shape of the disturbance such as the disturbance of the flow velocity or temperature in the fluid generally changes as it is transported with the fluid through the conduit. As a result, a similarity of the disturbances observed at the upstream sensor and the downstream sensor disappears in case the distance between these two sensors is excessive. Thus, the cross correlation peak indicating the maximum of the cross correlation becomes diffused and the accuracy of the measurement becomes poor. An optimum distance of the sensors giving a maximum accuracy of the measurement changes with the type of the fluid, the fluid velocity and the like.

In order to overcome the aforementioned problem and expand the measuring range, Iwamura proposed in the Laid Open Japanese patent application No. 59-173715 a cross correlation flowmeter having an upstream sensor and a plurality of downstream sensors. In the cross correlation flowmeter by Iwamura, respective downstream sensors are associated with respective correlators each of which calculates a cross correlation of the output signals from the upstream and downstream sensors to which the correlator is cooperating, whereby an optimal combination of the upstream sensor and the downstream sensor is selected responsive to the flow velocity of the fluid and the accuracy of the flow rate measurement is maximized. However, the cross correlation flowmeter by Iwamura requires a correlator for each of the plurality of the downstream sensors and the circuit construction is complicated. Further, a large number of correlators are required. Furthermore, as each of the correlators perform the cross correlation calculation, calculation time necessary for obtaining the flow rate becomes long.

Accordingly, it is an object of the present invention to provide a novel and useful cross correlation flowmeter in which the problems aforementioned are eliminated.

Another and more specific object of the present invention is to provide a cross correlation flowmeter for measuring a flow rate of a fluid flowing through a conduit comprising a first upstream sensor disposed on the conduit for sensing a passage of a disturbance of the fluid continuously changing as it is transported with the fluid through the conduit, a second upstream sensor disposed on the conduit adjacent to the first upstream sensor for sensing the passage of the disturbance substantially identical in shape with the disturbance sensed by the first sensing means, a plurality of downstream sensors disposed on the conduit along an elongating direction thereof at a relatively downstream side to the first and second upstream sensors with predetermined distances from the first upstream sensor, first flow velocity detection means for detecting an approximate flow velocity by calculating a cross correlation of output signals from the first and second upstream sensors, selection means for selecting one of the plurality of the downstream sensors which is optimum for the accurate flow rate measurement responsive to the first flow velocity, and second flow velocity detection and flow rate calculation means for detecting a second flow velocity by calculating a cross correlation of an output signals from the first upstream sensor and from the selected one of the downstream sensors and for calculating the flow rate of the fluid from the second flow velocity. According to the present invention, the accuracy of the flow rate measurement is maximized by selecting an optimum combination of the sensors providing an optimum distance for the measurement. Further, the circuit construction is simplified as only one correlation calculation means is required for the plurality of the downstream sensors. Furthermore, the calculation time is saved as the cross correlation calculation is not necessary for all of the upstream and downstream sensor combination. Thus, the response of the cross correlation flowmeter is improved.

Another objects and further features of the present invention will be apparent from the following detailed description when read in conjunction with the accompanying drawings.

DETAILED DESCRIPTION

Figure 1:
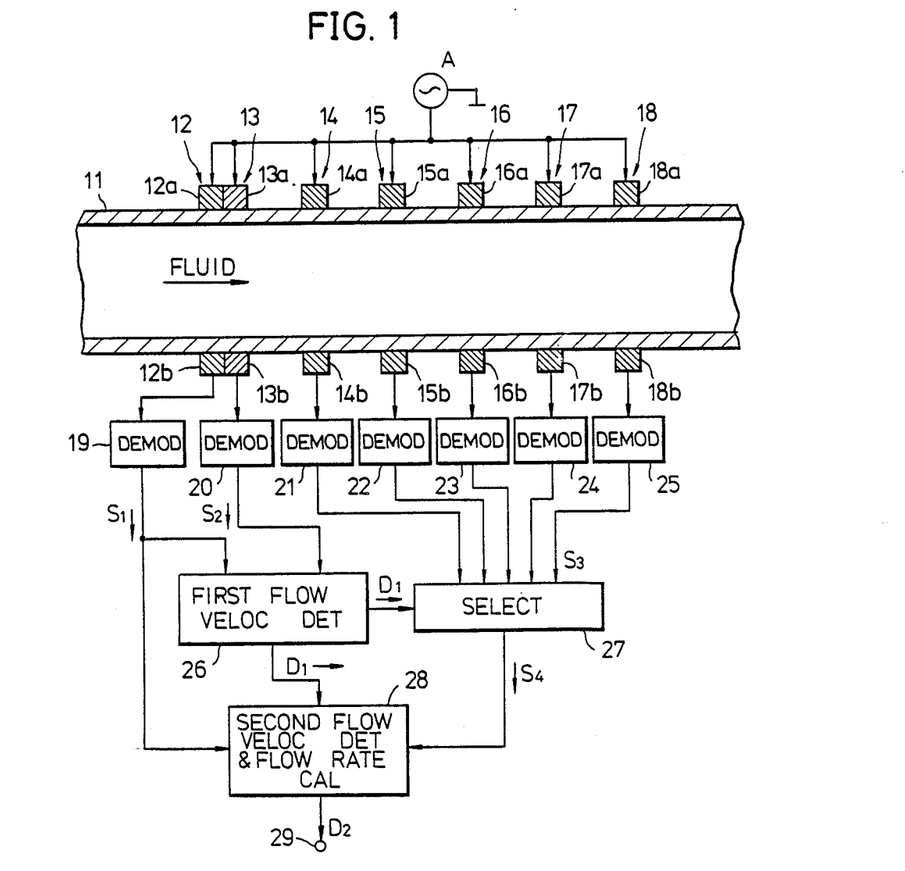
FIG. 1 is a systematic block diagram showing an embodiment of a cross correlation flowmeter according to the present invention.
Figure 2:
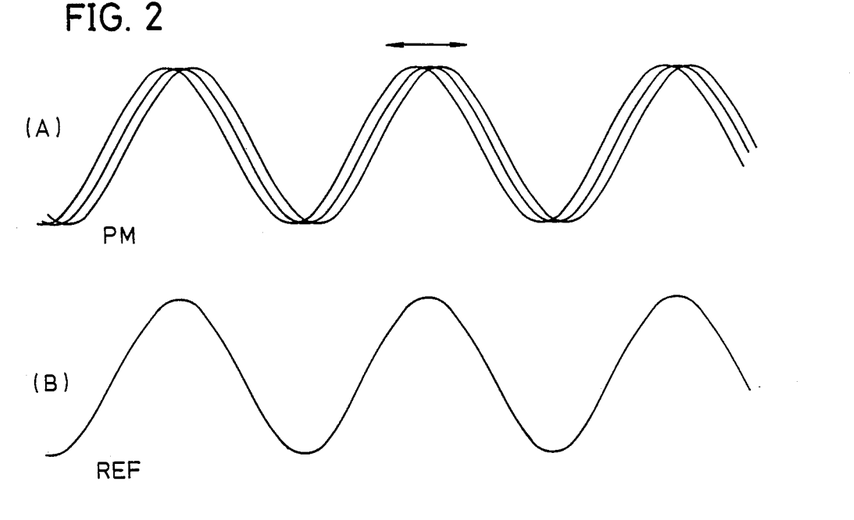
FIG. 2(A) is a diagram showing a wave form of a modulated signal supplied to a demodulator used in the cross correlation flowmeter of FIG. 1.
FIG. 2(B) is a diagram showing a wave form of a reference signal supplied to the demodulator in FIG. 1.
Figure 3:
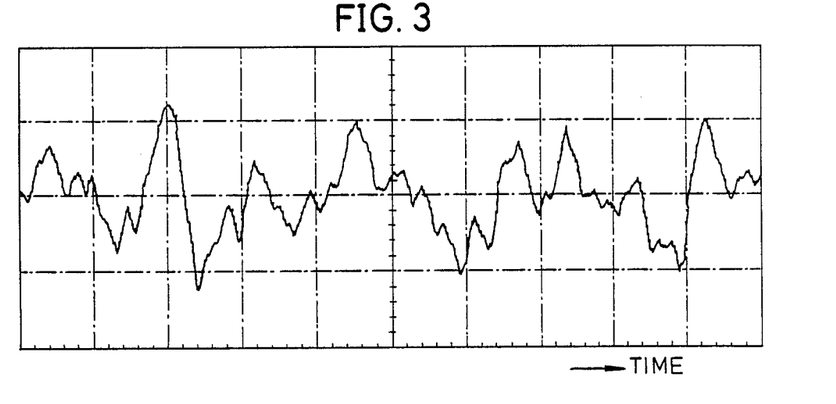
FIG. 3 is a diagram showing a wave form of an output signal produced by a demodulator in FIG. 1.

FIG. 1 is a systematic block diagram showing an embodiment of a cross correlation flowmeter according to the present invention. In the drawing, a fluid of which flow rate is to be measured flows through a conduit 11 from a left hand side thereof to a right hand side. The fluid includes a disturbance (not shown) which is transported through the conduit with the fluid. The disturbance changes continuously as it moves with the fluid. The conduit 11 is provided with a first upstream sensor 12 comprising an ultrasonic transducer 12a and a corresponding ultrasonic receiver 12b at an upstream position for sensing a passage of the disturbance. Further, a second upstream sensor 13 comprising an ultrasonic transducer 13a and a corresponding ultrasonic receiver 13b is provided on the conduit 11 at a downstream side relative to the sensor 12 but adjacent thereto for sensing the passage of the disturbance. The distance between the sensors 12 and 13 is selected such that the shape of the disturbance moving through the conduit 11 with the fluid does not change substantially in the interval defined by the sensors 12 and 13. The ultrasonic transducers 12a and 13a are driven by a common driving source A and produce a sinusoidal signal as shown in FIG. 2(B). The ultrasonic output signals from the ultrasonic transducers 12a and 13a are radiated into the fluid perpendicularly to the direction of the flow and arrives at respective ultrasonic receivers 12b and 13b. The arrival times of the ultrasonic output signals from the ultrasonic transducers 12a and 13a are changed by the disturbance in the conduit 11 and phase modulated signals such as shown in FIG. 2(A) are obtained from the ultrasonic receivers 12b and 13b. The output signals from the ultrasonic receivers 12b and 13b are then supplied to respective demodulators 19 and 20 and output, signals having an amplitude proportional to an amount of phase shift is obtained for example as shown in FIG. 3. In the wave form of FIG. 3, an ordinate represents the amount of phase shift and an abscissa represents the time axis.

Figure 4:
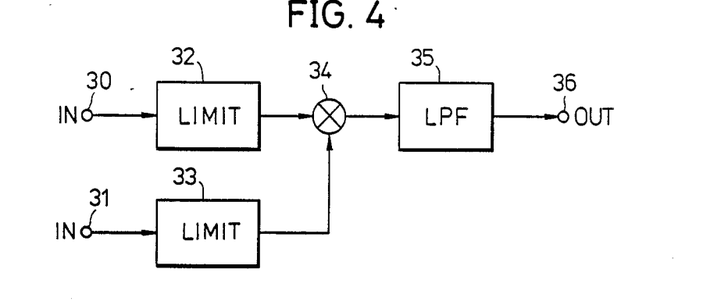
FIG. 4 is a systematic block diagram showing a circuit of the demodulator in FIG. 1.

FIG. 4 is a system block diagram showing the demodulators 19 and 20. The constructions of the demodulators 19 and 20 are identical so that the following description will be given only to the demodulator 19 and the description of the demodulator 20 will be omitted. The demodulator 19 is supplied with an output signal from the ultrasonic receiver 12b through an input terminal 30. The output signal from the ultrasonic receiver, supplied through the terminal 30 is then limited in amplitude thereof by a limiter 32 and supplied to a multiplier 34. The demodulator 19 is further supplied with a sinusoidal reference signal identical to a signal supplied to the ultrasonic transducer 12a from the driving source A through an input terminal 31. This sinusoidal reference signal is limited an amplitude thereof by a limiter 33 and supplied to the multiplier 34 for multiplication with an output signal from the limiter 32. An output signal from the multiplier 34 is further passed through a low pass filter 35 and supplied to an output terminal 36. Demodulators 19 and 20 respectively produce demodulated signals S1 and S2 which are supplied to first flow velocity detecting circuit 26 for obtaining a first flow velocity D1 indicating an approximate value of the flow velocity of the fluid.

Figure 5:
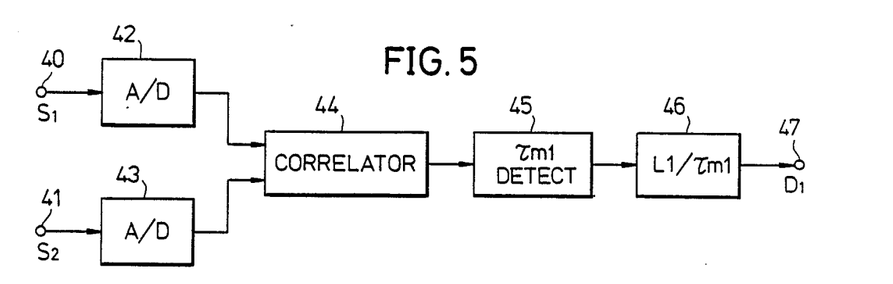
FIG. 5 is a systematic block diagram showing a first flow velocity detecting circuit used in the cross correlation flowmeter of FIG. 1.

FIG. 5 is a system block diagram showing the first flow velocity detecting circuit 26. As shown in FIG. 5, the first flow velocity detecting circuit 26 comprises an input terminals 40 and 41 to which the signals S1 and S2 are supplied, A/D converters 42 and 43 for converting the signals S1 and S2 to digital signals, a first correlator 44 for calculating a cross correlation R of the signal S1 and S2 as a function of a time difference $\tau$ representing a time difference between the signals S1 and S2, a first maximum correlation detector 45 for detecting a time difference $\tau m1$ at which the cross correlation R is maximized, and a first flow velocity calculator 46 for calculating the first flow velocity D1 by dividing a distance L1 between the first and second upstream sensors 12 and 13 by the time difference $\tau m1$. As the cross correlation R f the signals S1 and S2 is required to have a sharp peak for indicating the time difference $\tau m1$ unambiguously, the distance L1 between the first and second upstream sensors 12 and 13 is selected to a short distance such that no substantial change or decay in the disturbance may occur as the disturbance is transported between the sensors 12 and 13. It should be noted, however, that the distance L1 should be sufficiently large to allow the determination of the first flow velocity D1 with sufficient accuracy for the operation of a selecting circuit 27 to be described in later.

Figure 6:
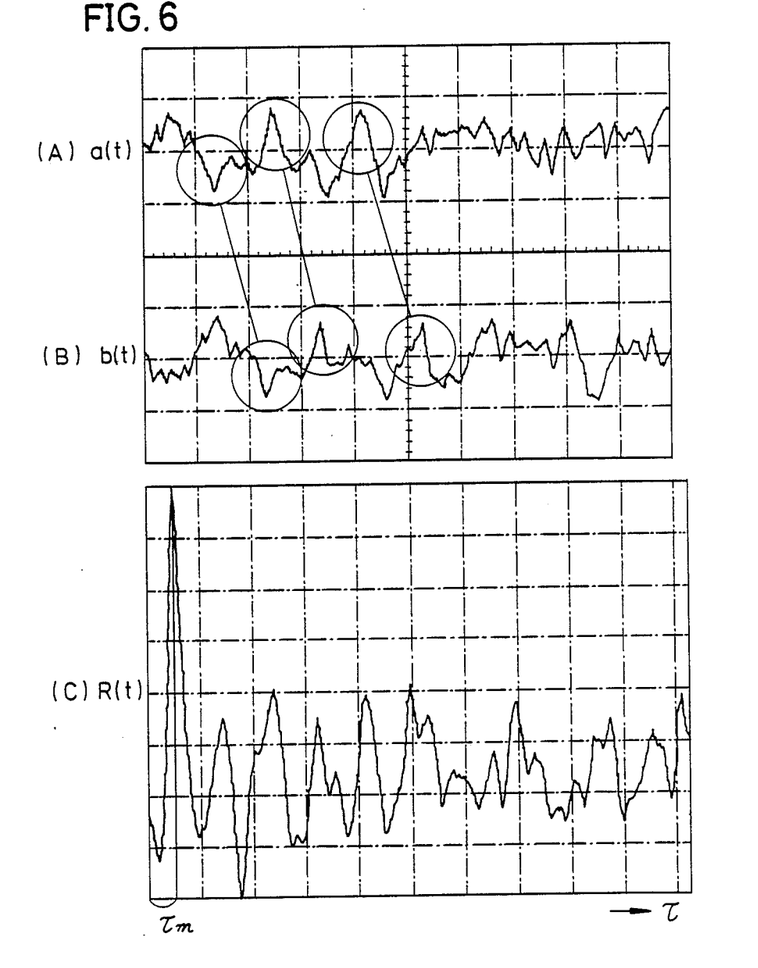
FIGS. 6(A) and 6(B) are a diagrams showing an example of wave forms of output signals produced by two demodulators respectively at an upstream position and a downstream position on the same time axis.
FIG. 6(C) is a graph showing a cross correlation of the signals in FIGS. 6(A) and 6(B)

FIGS. 6(A) and (B) respectively show wave form of the signals S1 and S2 supplied to the first correlator 44 from the demodulators 19 and 20 as signals a(t) and b(t)

and FIG. 6(C) is a graph showing the cross correlation R of the signals a(t) and b(t) as a function of the time difference : which is a time difference imposed between the signals S1 and S2. In FIG. 6(C), a time difference τm indicates the time difference at which the cross correlation is maximized. From FIG. 6(C), it can be seen that the cross correlation R has a sharp peak at the time difference of τm.

The distance between the first and second upstream sensors 12 and 13 can not be selected sufficiently long for an accurate flow rate measurement as substantially no change should occur in the disturbance between these sensors. Accordingly, the cross correlation flowmeter of the present invention further comprises a plurality of downstream sensors 14–18 (FIG. 1) provided on the conduit 11 along the elongating direction thereof at a downstream side to the first and second upstream sensors 12 and 13 with sufficient distances from the sensors 12 and 13 for accurate measurement of the flow rate. The sensors 14–18 respectively comprise ultrasonic transducers 14a–18a and ultrasonic receivers 14b–18b in a similar manner to the sensors 12 and 13. The ultrasonic transducers 14a–18a are driven by the common driving source A and radiate ultrasonic beams perpendicularly to the flow direction of the fluid. The respective ultrasonic beams are modulated the phases thereof in a similar manner as described with reference to FIG. 2 and modulated signals thus produced are received by corresponding ultrasonic receivers 14b–18b. Output signals from the ultrasonic receivers 14b–18b are then supplied to respective demodulators 21–25. The operation and construction of the demodulators 21–25 are identical to those of the demodulators 19 and 20 already described and the description thereof will be omitted.

Figure 7:
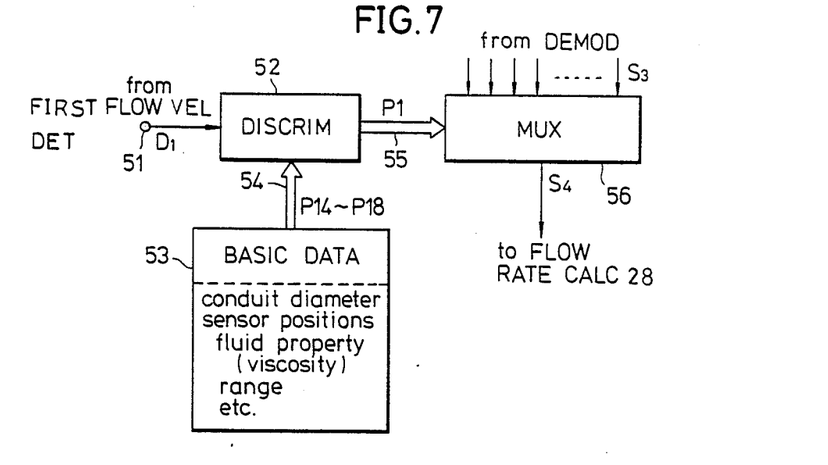
FIG. 7 is a systematic block diagram of selecting circuit used in the cross correlation flowmeter in FIG. 1.

Referring to FIG. 1 again, output signals S3 from the demodulators 21–25 have similar wave forms as signals S1 and S2. The output signals S3 are supplied to the selecting circuit 27. The selecting circuit 27 specifies one of the plurality of the downstream sensors 14–18 providing an optimum flow rate measurement in combination with the first upstream sensor 12 in response to the first flow velocity D1 from the first flow velocity detecting circuit 26 and produces an output signal S4 which corresponds to the output signal from the selected one of the plurality of downstream sensors 14–18 optimum for the flow rate measurement. FIG. 7 is a system block diagram of the selecting circuit 27. The selecting circuit 27 comprises a discriminator 52 for comparing a level of the first flow velocity D1 supplied thereto through an input terminal 51 with a plurality of switching level signals P14–P18 respectively specifying the plurality of the downstream sensors 14–18 produced and supplied thereto from a basic data circuit 53 through a bus 54. The basic data circuit 53 calculates the switching level signals P14–P18 on the basis of basic data such as flowmeter design parameters like distances between the respective combination of the sensors (sensor positions), conduit diameter and the like, fluid parameters such as viscosity, temperature and the like and a range parameter indicating the measuring range of the cross correlation flowmeter. The discriminator 52 selects one of the plurality of the downstream sensors 14–18 on the basis of the comparison of the first flow velocity D1 with the switching level signals P14–P18 and produce a signal P1 specifying the selected one of the plurality of the downstream sensors. The signal P1 is then supplied through a bus 55 to a multiplexer 56.

Figure 8:
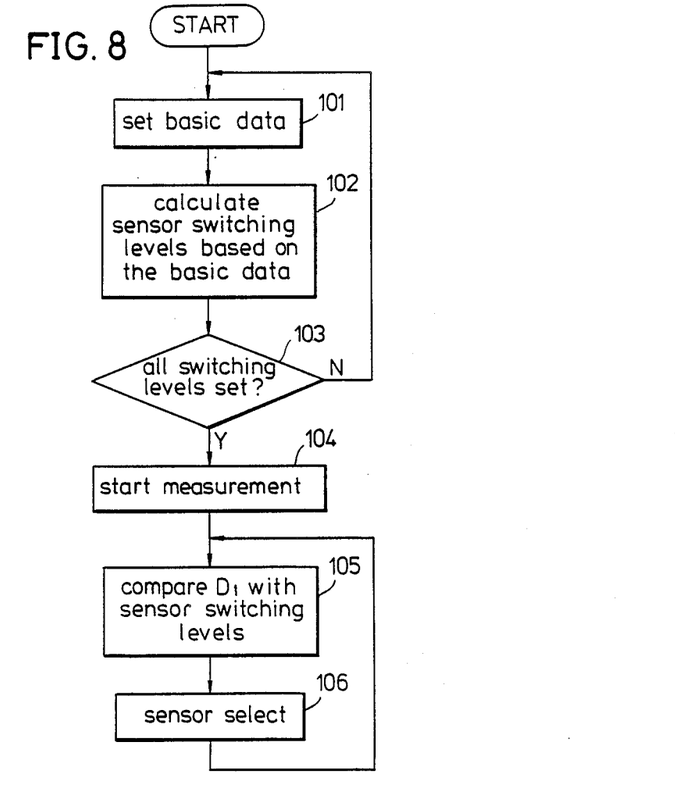
FIG. 8 is a flow chart showing an operation of the selecting circuit of FIG. 7.

The multiplexer 56 is supplied with a plurality of the output signals S3 similar to the output signals S1 and S2 from the respective demodulators 21–25 and selects one of the output signals S4 form the signals S3. The distance between the first upstream sensor 12 and the selected one of the downstream sensors is optimum for the flow rate measurement and provides a maximum accuracy. In other words, the distance between these sensors is sufficiently long for the measurement of the peak position of the cross correlation R yet sufficiently short to preserve a clear cross correlation peak. The selecting circuit 27 may be constructed by a digital apparatus for performing the functions in FIG. 7. FIG. 8 is a flow chart for explanation of the operation of the selecting circuit 27 of FIG. 7. In FIG. 8, the aforementioned basic data such as the distances between respective combinations of the sensors, conduit diameter, viscosity of the fluid, temperature, measuring range of the cross correlation flowmeter and the like, are set at step 101. At step 102, the respective switching level signals P14–P18 corresponding to the downstream sensors 14–18 are calculated. At step 103, a discrimination is made for discriminating whether all the switching level signals are correctly set and the flow rate measurement is started at step 104. At step 105, the level of the first flow velocity D1 is compared with the respective switching level signals P14–P18. Step 105 further produces the signal P1 specifying one of the downstream sensors 14–18 providing a maximum accuracy of the flow rate measurement in combination with the first upstream sensor 12 on the basis of the result of comparison. At step 106, an optimum downstream sensor is selected on the basis of the signal P1. Thus, it may be understood that the steps 101–103 correspond to operation of the basic data circuit 53 and the steps 104 and 105 correspond to operations of the discriminator 52. Further the step 106 corresponds to the multiplexer 56. However, digital implementation of the selecting circuit 27 of FIG. 7 is not limited to the example shown in the flow chart of FIG. 8. It should be noted that the discriminator 52 of FIG. 7 shows a hysteresis in the switching operation of the downstream sensors. For example, a switching level signal corresponding to a first downstream sensor such as the sensor 15 may be selected to be 2.5 volts. In case the flow rate is increasing and a level of the first flow velocity D1 is increasing, the actual switching of the downstream sensor from the first sensor to the second sensor such as the sensor 16 is made when the level the first flow velocity D1 exceeds 3 volts. On the contrary, in case the flow rate is decreasing and the level of the first flow velocity D1 is decreasing, the actual switching of the downstream sensor from the second sensor to the first sensor is made when the level of the first flow velocity decreases below 2 volts. With such an operation involving hysterisis, chattering operation of the sensors caused by variation of small signals in a critical state is avoided. The switching levels P14–P18 specifying one of the optimum downstream sensors are determined from numerous parameters such as the distance from the first upstream sensor to the respective downstream sensors, conduit diameter, fluid viscosity, measuring range and others. The switching levels change depending on the design of the cross correlation flowmeter.

Figure 9:
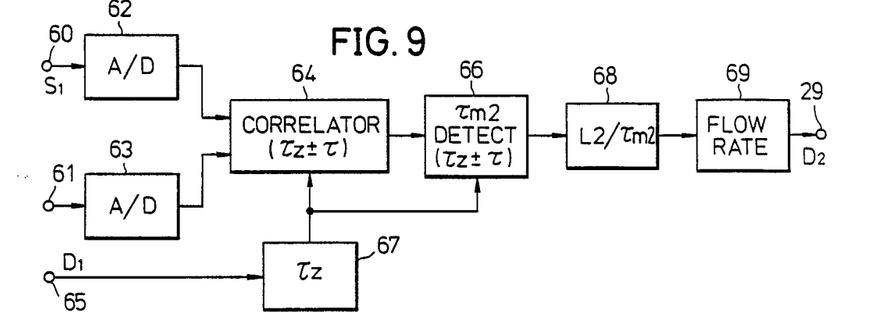
FIG. 9 is a systematic block diagram of a second flow velocity detection and flow rate calculation circuit used in the cross correlation flowmeter of FIG. 1.

The output signal S4 produced by the selecting circuit 27 is supplied to a second flow velocity detection and flow rate calculation circuit 28. FIG. 9 is a system block diagram of the second flow velocity detection and flow rate calculation circuit 28. Although the circuit 28 is shown as an assembly of separate circuits, the circuit 28 may be implemented by digital processor. The second flow velocity detection and flow rate calculation circuit 28 comprises an input terminal 60 to which the signal S1 from the demodulator 19 is supplied and an input terminal 61 to which the signal S4 is supplied from the selecting circuit 27. The signals S1 and S4 are then converted to digital signals by A/D converters 62 and 63 and supplied to a second correlator 64. The operation of the second correlator 64 is similar to the operation of the first correlator 44 of FIG. 5 except that the second correlator 64 carries out the calculation of the cross correlation at an interval of $(\tau z \pm \tau)$ in which the parameter $\tau z$ is a time at which the peak of the cross correlation is expected to appear. This parameter $\tau z$ is calculated on the basis of the first flow velocity D1 and a distance L2 which is a distance between the first upstream sensor 12 and the selected one of the downstream sensors (14–18). For this purpose, a maximum correlation predicting circuit 67 for calculating the parameter $z$ on the basis of the first flow velocity D1 and the distance L2 is provided and supplies the parameter $\tau z$ to the correlator 64. In the drawing, lines for supplying the first velocity D1 and the distance L2 to the circuit 67 are not shown for simplicity. Otherwise, the construction and operation of the second correlator 64 is the same as the first correlator 44 in FIG. 5 and no further description will be given here. An output signal from the correlator 64 is then supplied to a second maximum correlation detector 66. The second maximum correlation detector 66 finds out a maximum of the cross correlation R and obtains a time difference $\tau m2$ which is a time difference between the signals S1 and S4 at which the cross correlation is maximized in a similar manner to the first maximum correlation detector 45 in FIG. 5 except that the interval in which the detection of the maximum cross correlation is searched is limited to the interval of $(\tau z \pm \tau)$. For this purpose, the parameter $\tau z$ is supplied to the second maximum correlation detector 66 from the circuit 67 in a similar manner to the case of the correlator 64. Otherwise the construction and operation of the second maximum correlation detector 66 is the same as those of the first maximum correlation detector 45 of FIG. 5 and no further description will be given here. The procedure to limit the interval of calculation for the second correlator 64 and the second maximum correlation detector 66 will be apparent to those experienced in the art and the description thereof is omitted. The extent of the interval $(\tau z \pm \tau)$ is selected as small as possible but sufficiently large such that the time difference $\tau m2$ is safely included in the interval. As a result, unnecessary calculation is avoided and the calculation time is saved. Further, the wave forms of the signals S1 and S4 and the graph of the cross correlation R are similar to those shown in FIGS. 6(A), 6(B) and 6(C) and the illustration thereof are omitted. In the case of the second correlator 64, the peak of the cross correlation R is somewhat diffused as compared to the sharp cross correlation in the first correlator 44. Nevertheless, the combination of the distance L2 and the amount of the time difference $\tau m2$ is selected to be optimum and the measurement of the flow velocity can be achieved with maximum accuracy. Further, the distance L2 is divided by the time difference $\tau m2$ and a second flow velocity is calculated in a second flow velocity calculator 68 and a flow rate D2 is finally obtained in a flow rate calculator 69 by multiplying a cross sectional area of the conduit 11 to the flow velocity, and supplied to an output terminal 29.

Figure 10:
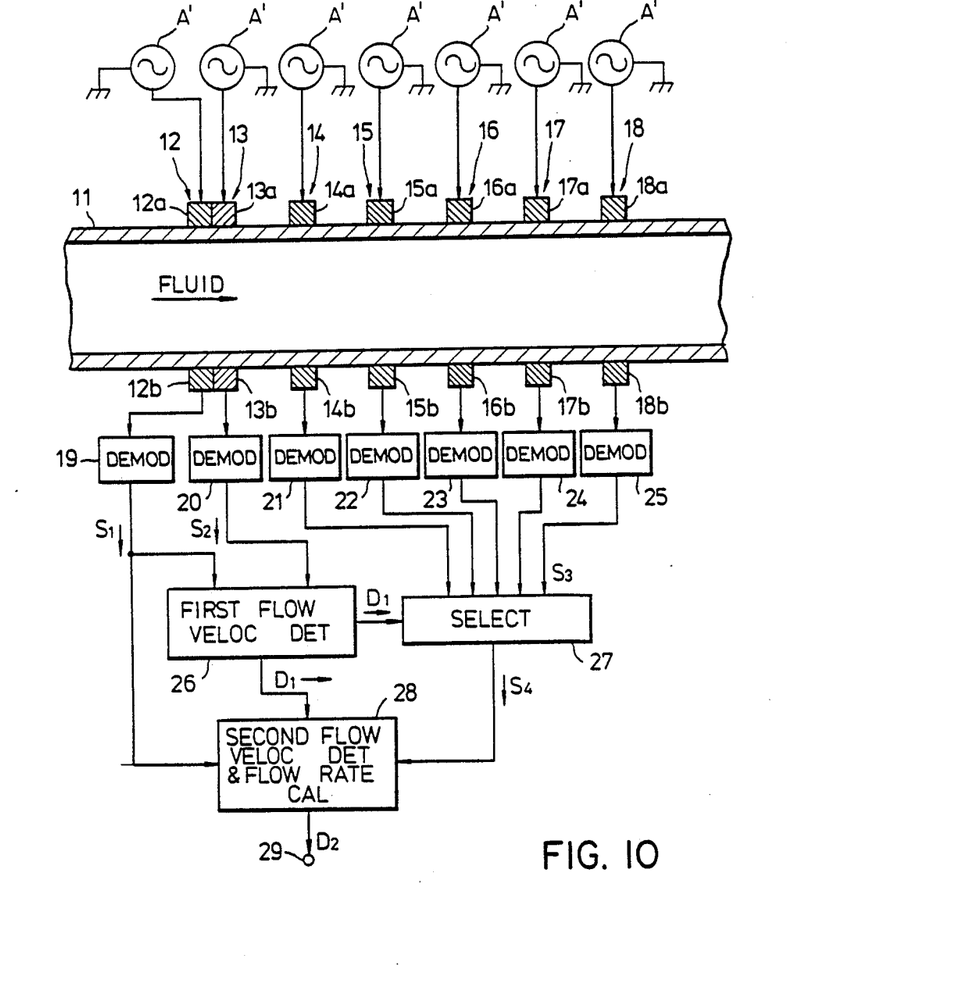
FIG. 10 is a systematic block diagram showing another embodiment of the cross correlation flowmeter according to the present invention.

FIG. 10 shows a modification of the flowmeter in FIG. 1. In the drawing, those portions constructed identically to these corresponding portions in FIG. 1 are given identical reference numerals and the descriptions thereof are omitted. Referring to the drawing, a driving source A' constructed and operating identically to the driving source A in FIG. 1 drives the respective ultrasonic transducers 12a–18a individually. The principle and operation of the flowmeter is identical to the flowmeter in FIG. 1 and further description thereof will be omitted.

Figure 11:
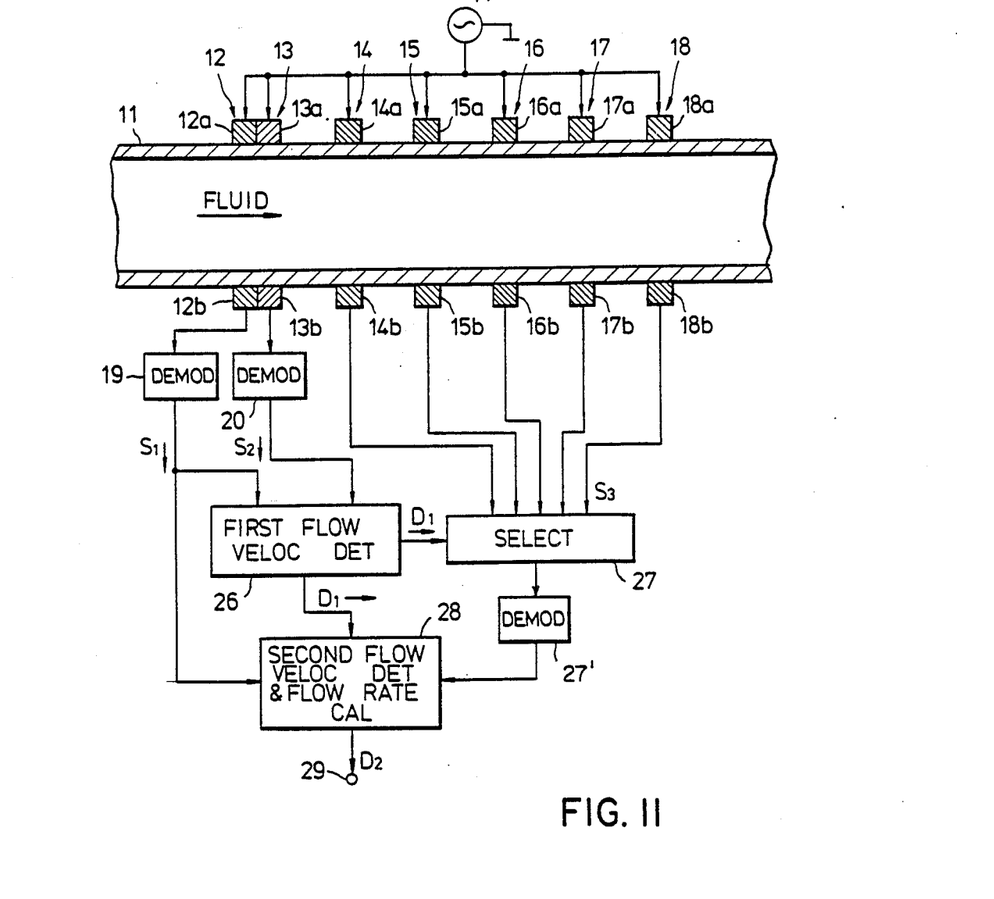
FIG. 11 is a systematic block diagram showing still another embodiment of the cross correlation flowmeter according to the present invention.

FIG. 11 shows another modification of the flowmeter in FIG. 1 in which a single demodulator 21' is used instead of a plurality of the demodulators 21-25 in FIG. 1. In the drawing, those portions constructed identically to those corresponding portions in FIG. 1 are given identical reference numerals and the description thereof will be omitted.

Referring to the drawing, the selecting circuit 27 operates identically as that in the flowmeter of FIG. 1 and selects one of the ultrasonic receivers 14b–18b responsive to the first flow velocity D1 from the circuit 26. The output signal of the ultrasonic receivers thus selected is supplied to a single demodulator 21' which is constructed identically with the demodulators 21-25 in FIG. 1 and operates identically. Thus, the second flow velocity detection and flow rate calculation circuit 28 is supplied with an input signal from the demodulator 21' in exactly the same manner as the flowmeter in FIG. 1.

Figure 12:
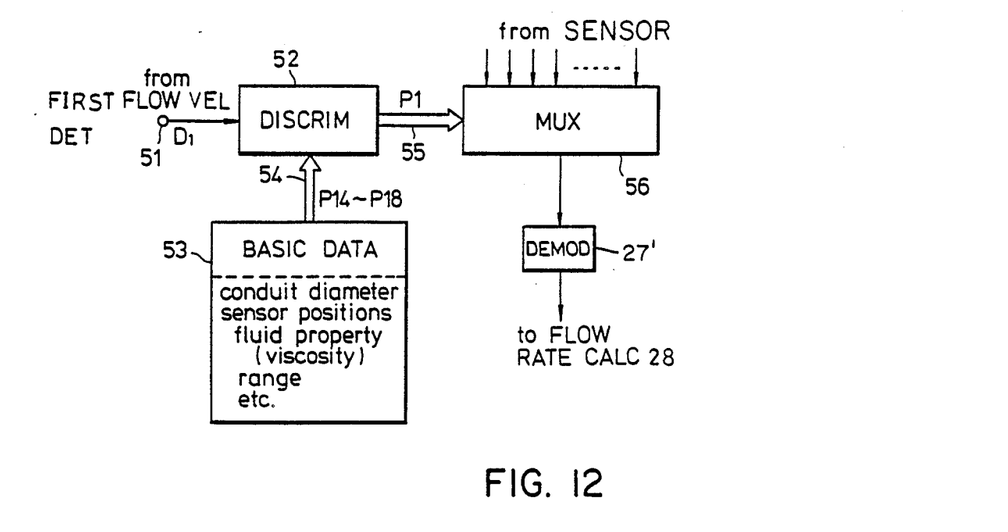
FIG. 12 is a systematic block diagram of a selecting circuit used in the cross correlation flowmeter of FIG. 11.

FIG. 12 shows the construction of the selecting circuit 27 in FIG. 11. As can be seen in the drawing, the construction of the selecting circuit is identical to the circuit 27 in FIG. 1. Other constructions and operations of the flowmeter in FIG. 11 are identical to those in FIG. 1 and further description thereof will be omitted.

Further, the present invention is not limited to these embodiments, but various variations and modifications may be made without departing from the scope of the present invention.

What is claimed is:

1. A cross correlation flowmeter for measuring a flow rate of a fluid involving a disturbance or second phase transported with said fluid, said disturbance or second phase continuously changing as it is transported with said fluid, said cross correlation flowmeter comprising:

a conduit for passing said fluid, the flow rate of which is to be measured;

first upstream sensing means disposed at an upstream position on said conduit for sensing a passage of said disturbance or second phase transported through the conduit with said fluid and providing a first output signal;

second upstream sensing means disposed on said conduit adjacent to said first upstream sensing means along a longitudinal direction of said conduit for sensing a passage of said disturbance or second phase transported through said conduit with said fluid and providing a second output signal, said first upstream sensing means and said second upstream sensing means being separated along the longitudinal direction of said conduit by a distance sufficiently short such that said first and second upstream sensing means respectively sense the passages of a substantially identical disturbance;

a plurality of downstream sensing means disposed on said conduit along the longitudinal direction of said conduit at a downstream side relative to said first and second upstream sensing means with respective predetermined distances from said first upstream sensing means for sensing passages of said disturbance or second phase sensed by said first upstream sensing means after respective delay times and providing output signals;

first flow velocity detection means supplied with said first and second output signals from said first and second upstream sensing means for calculating a first cross correlation between said first and second output signals while imposing a varying time difference between said first and second output signals, said first flow velocity detection means calculating a first flow velocity from a first time difference at which said first cross correlation is maximized and providing a signal indicating same;

selection means supplied with said output signals from said plurality of downstream sensing means and further supplied with said first flow velocity signal from said first velocity detection means for selecting, responsive to said first flow velocity, the one of said downstream sensing means which provides a maximum accuracy for the flow rate measurement in combination with said first upstream sensing means, said selection means producing a third output signal corresponding to an output signal from the selected one of said plurality of downstream sensing means; and second flow velocity detection and flow rate calculation means supplied with said first output signal, said signal from said first flow velocity detection means and said third output signal from said selection means for calculating a second cross correlation of said first and third output signals while imposing a varying time difference between said first and third output signals and for calculating a second flow velocity and the flow rate from a second time difference at which said second cross correlation is maximized.

2. A cross correlation flowmeter as claimed in claim 1 in which said first upstream sensing means is disposed on said conduit at an upstream side relative to said second upstream sensing means.

3. A cross correlation flowmeter as claimed in claim 1 in which each of said first upstream sensing means, second upstream sensing means and said plurality of downstream sensing means comprises ultrasonic transducers for radiating ultrasonic signals to said fluid in said conduit and corresponding ultrasonic receivers for receiving said ultrasonic signals subjected to phase modulation by said disturbance or second phase.

4. A cross correlation flowmeter as claimed in claim 3 in which said ultrasonic transducers are driven by a common driving source and radiate sinusoidal ultrasonic signals to said fluid in said conduit, and said ultrasonic receivers receive said sinusoidal ultrasonic signals radiated by the transducers and subjected to phase modulation by said disturbance or second phase.

5. A cross correlation flowmeter as claimed in claim 3 in which said ultrasonic transducers are driven by respective driving sources and radiate sinusoidal ultrasonic signals to said fluid in said conduit, and said ultrasonic receivers receive said sinusoidal signals radiated by the transducers and subjected to phase modulation by said disturbance or second phase.

6. A cross correlation flowmeter as claimed in claim 3 in which said ultrasonic receivers are connected with respective demodulators so as to supply respective output signals to corresponding demodulators.

7. A cross correlation flowmeter as claimed in claim 3 in which a common demodulator is coupled with at least some of said ultrasonic receivers for demodulating signals from said at least some ultrasonic receivers.

8. A cross correlation flowmeter as claimed in claim 1 in which said second flow velocity detection and flow rate calculation means comprises means for predicting said second time difference at which said second cross correlation is maximized on the basis of said first flow velocity, said second flow velocity detection and flow rate calculation means carrying out said calculation of second cross correlation for obtaining said second flow velocity and the flow rate for a time interval limited to a relatively short range at which interval said second cross correlation is predicted to have a maximum.

9. A cross correlation flowmeter as claimed in claim 1 in which said selection means produces a plurality of switching level signals respectively corresponding to said plurality of downstream sensing means, said plurality of switching level signals being compared with said first flow velocity signal and said selection of said one of said downstream sensing means being made in response to a result of said comparison.

10. A cross correlation flowmeter as claimed in claim 1 in which said first flow velocity detection means comprises a first pair of analogue to digital converters for converting said first and second output signals to a first pair of digital signals for calculation of said first cross correlation, said second flow velocity detection and flow rate calculation means comprises a second pair of analogue to digital converters for converting said first and third output signals to a second pair of digital signals for calculation of said second cross correlation.

11. A cross correlation flowmeter as claimed in claim in which said first flow velocity detection means and said second flow velocity detection and flow rate calculation means use a pair of analogue to digital converters in common for converting said first and second output signals to a first pair of digital signals and for converting said first and third output signals to a second pair of digital signals, said first cross correlation and said second cross correlation being calculated on the basis of said first and second pairs of digital signals, respectively.

* * * * *

UNITED STATES PATENT AND TRADEMARK OFFICE
CERTIFICATE OF CORRECTION

PATENT NO. : 4,841,780

DATED : June 27, 1989

INVENTOR(S) : Yutaka Inada et al

It is certified that error appears in the above-identified patent and that said Letters Patent is hereby corrected as shown below:

Column 10, line 47    after "claim" insert ---1---

Signed and Sealed this

Twenty-third Day of July, 1991

Attest:

HARRY F. MANBECK, JR.

*Attesting Officer*    *Commissioner of Patents and Trademarks*